(12) United States Patent
Tokai et al.

(10) Patent No.: US 10,613,775 B2
(45) Date of Patent: Apr. 7, 2020

(54) TAPE STORAGE DEVICE AND CONTROL METHOD USING QUALITY INFORMATION

(71) Applicant: FUJIFILM CORPORATION, Minato-ku, Tokyo (JP)

(72) Inventors: Naoaki Tokai, Kanagawa (JP); Hirokazu Hashimoto, Kanagawa (JP); Yosuke Sumiya, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 63 days.

(21) Appl. No.: 15/954,628

(22) Filed: Apr. 17, 2018

(65) Prior Publication Data

US 2018/0314442 A1  Nov. 1, 2018

(30) Foreign Application Priority Data

Apr. 28, 2017  (JP) .................. 2017-089550

(51) Int. Cl.
| | | |
|---|---|---|
| G06F 3/06 | (2006.01) | |
| G11B 27/11 | (2006.01) | |
| G11B 15/07 | (2006.01) | |
| G11B 27/36 | (2006.01) | |
| G11B 15/05 | (2006.01) | |
| G11B 23/04 | (2006.01) | |

(52) U.S. Cl.
CPC .......... *G06F 3/0619* (2013.01); *G06F 3/0653* (2013.01); *G06F 3/0658* (2013.01); *G06F 3/0686* (2013.01); *G11B 15/05* (2013.01); *G11B 15/07* (2013.01); *G11B 23/042* (2013.01); *G11B 27/11* (2013.01); *G11B 27/36* (2013.01); *G11B 2220/655* (2013.01)

(58) Field of Classification Search
CPC .... G06F 3/0682; G06F 3/0619; G06F 3/0653; G06F 2212/213; G06F 3/0686
See application file for complete search history.

(56) References Cited

U.S. PATENT DOCUMENTS

| | | | | |
|---|---|---|---|---|
| 2010/0321811 A1* | 12/2010 | Goberis | ............ | G11B 15/6835 360/31 |
| 2013/0083638 A1* | 4/2013 | Edling | ................ | G11B 15/689 369/53.1 |
| 2014/0146650 A1* | 5/2014 | Alber | ................... | G11B 27/002 369/53.41 |
| 2017/0194029 A1* | 7/2017 | Bentley | ............... | G06F 11/1451 |

FOREIGN PATENT DOCUMENTS

| | | | |
|---|---|---|---|
| JP | H07-57229 | A | 3/1995 |
| JP | H10-340401 | A | 12/1998 |
| JP | 2002-222395 | A | 8/2002 |
| JP | 2004-310871 | A | 11/2004 |

* cited by examiner

*Primary Examiner* — Than Nguyen
(74) *Attorney, Agent, or Firm* — Solaris Intellectual Property Group, PLLC

(57) ABSTRACT

A recording control device reads tape quality information recorded on an RFID tag included in a recording tape cartridge, acquires drive quality information indicating quality of each of a plurality of tape drives that are loading targets of the recording tape cartridge, and prohibits reading or writing of data from or to the recording tape using the tape drive in a combination of which the quality is lower than predetermined quality among combinations of quality of the recording tape cartridge indicated by the read tape quality information and quality of each of the plurality of tape drives indicated by the acquired drive quality information.

5 Claims, 6 Drawing Sheets

| BLOCK 1 | BLOCK 2 | BLOCK 3 | BLOCK 4 | BLOCK 5 | ... | BLOCK n | AVERAGE VALUE |
|---|---|---|---|---|---|---|---|
| 2.0 | 1.0 | 1.0 | 3.0 | 6.0 | ... | 2.0 | 2.3 |

| DRIVE 1 | DRIVE 2 | ... | DRIVE m |
|---|---|---|---|
| 2.0 | 1.0 | ... | 2.0 |

FIG. 8

| TAPE DRIVE | TAPE TAPE QUALITY VALUE | TAPE 1 | TAPE 2 | TAPE 3 | TAPE 4 | TAPE 5 | TAPE 6 | TAPE 7 | TAPE 8 | TAPE 9 | TAPE 10 |
|---|---|---|---|---|---|---|---|---|---|---|---|
| | DRIVE QUALITY VALUE | 3.0 | 7.3 | 4.1 | 1.8 | 2.3 | 1.2 | 4.0 | 3.3 | 5.0 | 2.0 |
| DRIVE 1 | 3.0 | 9.0 | 21.9 | 12.3 | 5.4 | 6.9 | 3.6 | 12.0 | 9.9 | 15.0 | 6.0 |
| DRIVE 2 | 2.0 | 6.0 | 14.6 | 8.2 | 3.6 | 4.6 | 2.4 | 8.0 | 6.6 | 10.0 | 4.0 |
| DRIVE 3 | 5.0 | 15.0 | 36.5 | 20.5 | 9.0 | 11.5 | 6.0 | 20.0 | 16.5 | 25.0 | 10.0 |
| DRIVE 4 | 3.0 | 9.0 | 21.9 | 12.3 | 5.4 | 6.9 | 3.6 | 12.0 | 9.9 | 15.0 | 6.0 |

COMBINATION QUALITY VALUE

TAPE STORAGE DEVICE AND CONTROL METHOD USING QUALITY INFORMATION

CROSS-REFERENCE TO RELATED APPLICATION

This application claims priority under 35 USC 119 from Japanese Patent Application No. 2017-089550 filed on Apr. 28, 2017, the disclosure of which is incorporated by reference herein in its entirety.

BACKGROUND OF THE INVENTION

1. Field of the Invention

The present disclosure relates to a recording control device and a recording control method.

2. Description of the Related Art

In the related art, a magnetic recording medium in which a radio data carrier is attached to a hub of a tape wound body in which a magnetic tape is wound around the hub, and quality information of the tape wound body is written to the radio data carrier has been proposed (see JP2004-310871A).

Further, a technology in which all disk surfaces are scanned in order to detect a defect in a hard disk drive, and failure of a combination of a head and a disk is determined using the number of defects detected through the scanning of all the disk surfaces has been proposed (See JP1998-340401A (JP-H10-340401A)).

Further, a technology for performing positioning of a magnetic head using a position error signal (PES) has been proposed (See JP1995-57229A (JP-H07-57229A)).

Further, a media management device that manages a medium to which a non-contact integrated circuit (IC) label having a nonvolatile memory area is attached has been proposed (see JP2002-222395A).

SUMMARY OF THE INVENTION

Incidentally, it is possible to estimate an error rate in a case where reading or writing of data from or to the recording tape cartridge is performed, using tape quality information indicating quality of the recording tape cartridge.

However, in a case where the recording tape cartridge is loaded into any one of a plurality of tape drives without considering quality of the tape drive that is a loading target of the recording tape cartridge, the following problem may occur.

That is, in this case, even in a case where the quality of the recording tape cartridge satisfies a reference, an error may occur in reading or writing of data from or to the recording tape cartridge using this tape drive according to the quality of the loaded tape drive.

In the technologies described in JP2004-310871A, JP1998-340401A (JP-H10-340401A), JP1995-57229A (JP-H07-57229A), and JP2002-222395A, a combination of quality of the recording tape cartridge and quality of the tape drive is not considered.

The present disclosure has been made in view of the above circumstances, and an object of the present invention is to provide a recording control device and a recording control method capable of reducing an error rate of reading or writing of data from or to a recording tape included in a recording tape cartridge.

In order to achieve the above object, a recording control device of the present disclosure comprises a reading unit that reads tape quality information indicating quality of a recording tape cartridge recorded on a recording medium included in the recording tape cartridge; an acquisition unit that acquires drive quality information indicating quality of each of a plurality of tape drives that are loading targets of the recording tape cartridge; and a prohibition unit that prohibits reading or writing of data from or to the recording tape using the tape drive in a combination of which the quality is lower than predetermined quality among combinations of quality of the recording tape cartridge indicated by the tape quality information read by the reading unit and quality of each of the plurality of tape drives indicated by the drive quality information acquired by the acquisition unit in a case where reading or writing of data from or to the recording tape included in the recording tape cartridge is performed.

The recording control device according to the present disclosure may further comprise a control unit that selects the tape drive in a combination of which the quality is equal to or higher than the predetermined quality among combinations of quality of the recording tape cartridge indicated by the tape quality information read by the reading unit and quality of each of the plurality of tape drives indicated by the drive quality information acquired by the acquisition unit and performs control for reading or writing of data from or to the recording tape in a case where reading or writing of data from or to the recording tape is performed.

Further, in the recording control device according to the present disclosure, the tape quality information may be information indicating quality at predetermined intervals in a pullout direction of the recording tape, and the control unit may select the tape drive in a combination of which the quality is equal to or higher than the predetermined quality among combinations of the quality corresponding to a portion that is a target of reading or writing of the data of the recording tape and quality of each of the plurality of tape drives indicated by the drive quality information acquired by the acquisition unit, and perform the control.

Further, in the recording control device of the present disclosure, the recording medium may be a recording medium that is built into the recording tape cartridge, recorded information being readable without contact.

Meanwhile, in order to achieve the above object, a recording control method of the present disclosure includes reading tape quality information indicating quality of a recording tape cartridge recorded on a recording medium included in the recording tape cartridge; acquiring drive quality information indicating quality of each of a plurality of tape drives that are loading targets of the recording tape cartridge; and prohibiting reading or writing of data from or to the recording tape using the tape drive in a combination of which the quality is lower than predetermined quality among combinations of quality of the recording tape cartridge indicated by the read tape quality information and quality of each of the plurality of tape drives indicated by the acquired drive quality information in a case where reading or writing of data from or to the recording tape included in the recording tape cartridge is performed.

According to the present disclosure, it is possible to reduce the error rate of reading or writing of data from or to the recording tape included in the recording tape cartridge.

BRIEF DESCRIPTION OF THE DRAWINGS

FIG. 8 is a diagram illustrating an example of values indicating quality of a combination of a recording tape cartridge and a tape drive according to the embodiment.

DESCRIPTION OF THE PREFERRED EMBODIMENTS

Hereinafter, embodiments of the present disclosure will be described in detail with reference to the drawings.

Figure 1:
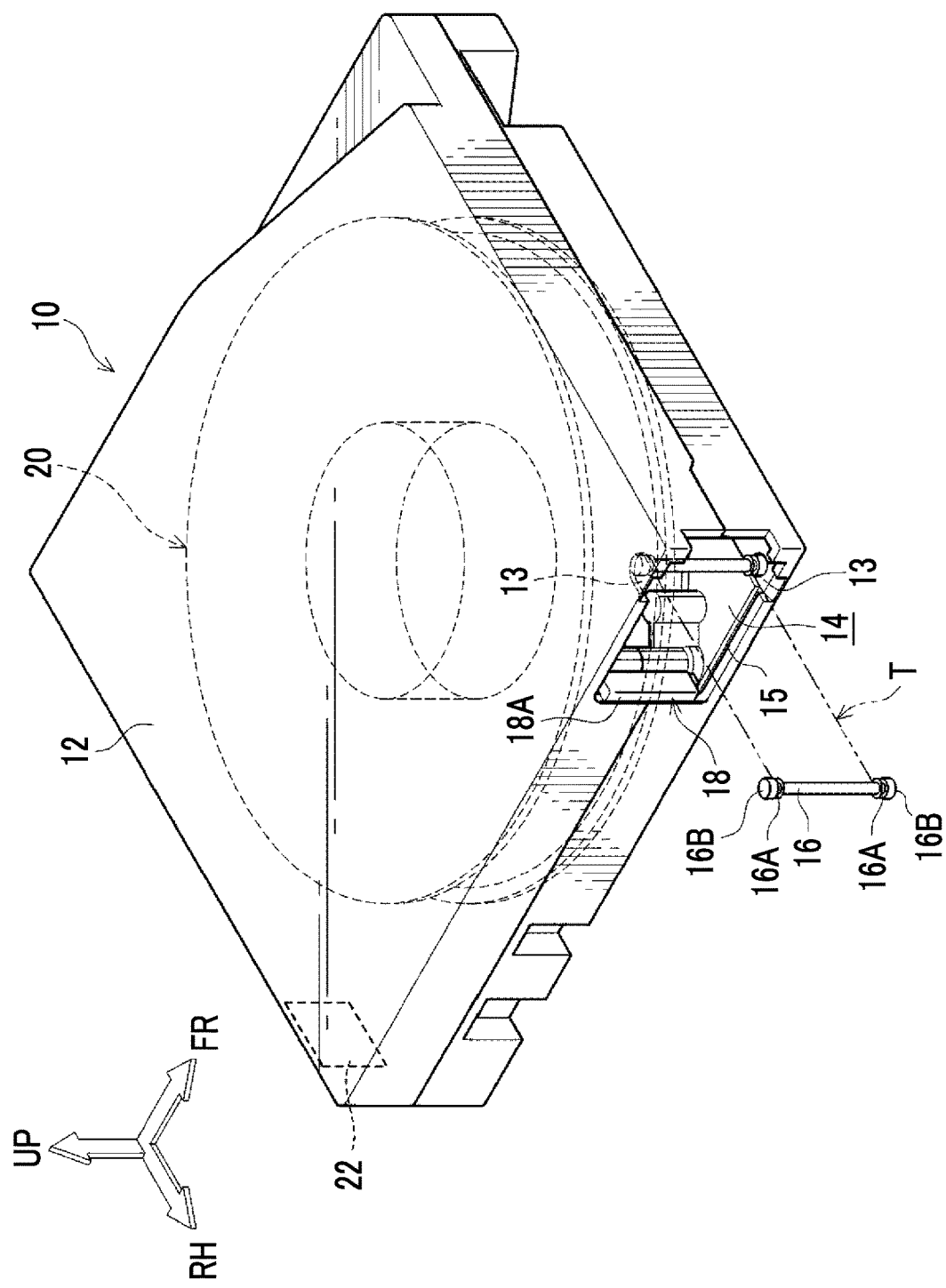
FIG. 1 is a perspective view illustrating an example of a recording tape cartridge according to an embodiment.

First, referring to FIG. 1, a configuration of a recording tape cartridge 10 according to the embodiment will be described. In FIG. 1, for convenience of description, a loading direction of the recording tape cartridge 10 to a tape drive 38 (see FIG. 3) is indicated by an arrow FR. Further, hereinafter, the direction indicated by the arrow FR is set as a front direction (a front side) of the recording tape cartridge 10. Further, hereinafter, a direction indicated by an arrow RH orthogonal to the arrow FR is set as a right direction (a right side) of the recording tape cartridge 10, and a direction indicated by an arrow UP orthogonal to the arrow FR and the arrow RH is set as an upward direction (an upper side) of the recording tape cartridge 10.

As illustrated in FIG. 1, the recording tape cartridge 10 according to the embodiment includes a case 12 formed of a resin material such as polycarbonate (PC) in a substantially rectangular box shape. Inside the case 12, a resin-made reel 20 around which a recording tape T such as a magnetic tape as an information recording and reproducing medium is wound and mounted is rotatably accommodated.

An opening 14 for pulling out the recording tape T is formed in a front portion of a right wall of the case 12. A leader pin 16 as a leader member that is pulled out while being locked by a pullout member (not illustrated) of the tape drive 38 is fixed to a free end portion of the recording tape T pulled out from the opening 14. An annular groove 16A is formed on both axial sides of the leader pin 16, and the annular groove 16A is locked to a hook of the pullout member or the like.

Further, a pair of upper and lower pin holding portions 13 for positioning and holding the leader pin 16 in the case 12 is formed inside the opening 14 of the case 12. The pin holding portion 13 is formed in a substantially semicircular shape with the side from which the recording tape T is pulled out being open, and both axial end portions 16B of the leader pin 16 in an upright state can enter or leave from the open side of the pin holding portion 13 to the inside of the pin holding portion 13.

Further, the opening 14 of the case 12 is opened and closed by a door 18. The door 18 is formed in a substantially rectangular plate shape having a size capable of closing the opening 14. A groove 15 into which upper and lower end portions of the door 18 are slidably inserted is formed inside the opening 14 such that the door 18 can move along the right wall of the case 12.

Further, a convex portion 18A for an opening and closing operation protrudes rightward at a front end portion of the door 18. The convex portion 18A is engaged with an engaging member (not illustrated) of the tape drive 38 according to loading of the recording tape cartridge 10 into the tape drive 38, such that the door 18 is opened.

Further, a Radio Frequency Identifier (RFID) tag 22 as an example of a recording medium from which recorded information can be read without contact through radio communication or the like is built into the case 12. Note that, although FIG. 1 illustrates an example in which the RFID tag 22 is disposed at a right rear portion in the case 12, a disposing position of the RFID tag 22 in the case 12 is not particularly limited. The disposing position of the RFID tag 22 in the case 12 may be, for example, a position at which information can be read without contact from the RFID tag 22 by a reading unit 42 to be described below.

Further, the RFID tag 22 according to the embodiment is an RFID tag of a method in which recorded information is transmitted to a reading device such as an RFID reader according to radio waves transmitted by the reading device (a so-called passive method).

Figures 2, 3:
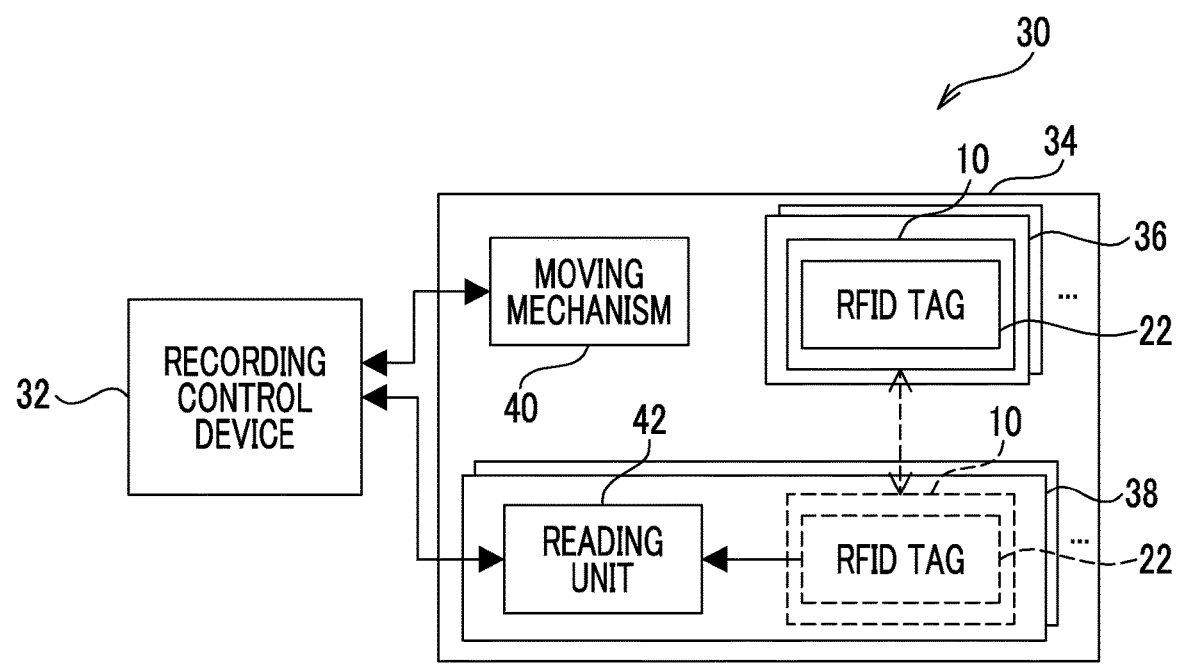
FIG. 2 is a diagram illustrating an example of tape quality information according to the embodiment.
FIG. 3 is a block diagram illustrating an example of a configuration of a recording system according to the embodiment.

Further, tape quality information indicating quality of the recording tape cartridge 10 is recorded on the RFID tag 22 according to the embodiment. FIG. 2 illustrates an example of the tape quality information. As illustrated in FIG. 2, the tape quality information according to the embodiment includes a position error signal (PES) level of each of blocks at predetermined intervals (for example, intervals of 100 m) in a pullout direction of the recording tape T, and an average value of the PES levels of all the blocks. In the embodiment, the average value of the PES levels is a value indicating the quality of the recording tape cartridge 10 (hereinafter referred to as a "tape quality value").

The PES level according to the embodiment is a value indicating the level of the PES based on a servo signal recorded on the recording tape T measured in a production process of the recording tape cartridge 10. Further, in the embodiment, the PES level is a value of an integer of 1 to 10, and a smaller value indicates higher quality of the recording tape cartridge 10. Note that in the embodiment, the tape quality information including the PES level measured in the production process of the recording tape cartridge 10 is recorded on the RFID tag 22 in advance.

Note that the tape quality value is not limited to the PES level, and may be another value indicating the quality of the recording tape cartridge 10 that can be measured in the production process of the recording tape cartridge 10.

Next, a configuration of a recording system 30 according to the embodiment will be described with reference to FIG. 3. As illustrated in FIG. 3, the recording system 30 includes a recording control device 32 and a tape library 34.

The tape library 34 according to the embodiment includes a plurality of slots 36, a plurality of tape drives 38, and a moving mechanism 40. The recording tape cartridge 10 is stored in the slot 36. In a case where reading or writing from or to the recording tape T of the recording tape cartridge 10 is performed, the recording tape cartridge 10 is loaded into the tape drive 38. Further, after the reading or writing of the recording tape T of the recording tape cartridge 10 loaded into the tape drive 38 is completed, the recording tape cartridge 10 is unloaded from the tape drive 38. The tape drive 38 according to the embodiment includes a reading unit 42 built thereinto. The recording control device 32 and the reading unit 42 are communicatably connected to each other. An example of the recording control device 32 includes an information processing device such as a personal computer or a server computer.

The moving mechanism 40 according to the embodiment takes out the recording tape cartridge 10 from the slot 36 and loads the recording tape cartridge 10 taken out into the tape drive 38 under the control of the recording control device 32. Further, under the control of the recording control device 32, the moving mechanism 40 unloads the recording tape cartridge 10 from the tape drive 38 and stores the unloaded recording tape cartridge 10 in the slot 36.

The reading unit 42 according to the embodiment reads the tape quality information recorded on the RFID tag 22 built into the recording tape cartridge 10 without contact and outputs the read tape quality information to the recording control device 32 under the control of the recording control device 32. Specifically, the reading unit 42 transmits radio waves to the RFID tag 22 under the control of the recording control device 32. In a case where the RFID tag 22 receives the radio waves transmitted from the reading unit 42, the RFID tag 22 transmits the tape quality information recorded on the RFID tag 22 to the reading unit 42. The reading unit 42 receives the tape quality information transmitted from the RFID tag 22, and outputs the received tape quality information to the recording control device 32. An example of the reading unit 42 is an RFID reader.

Figures 4, 5:
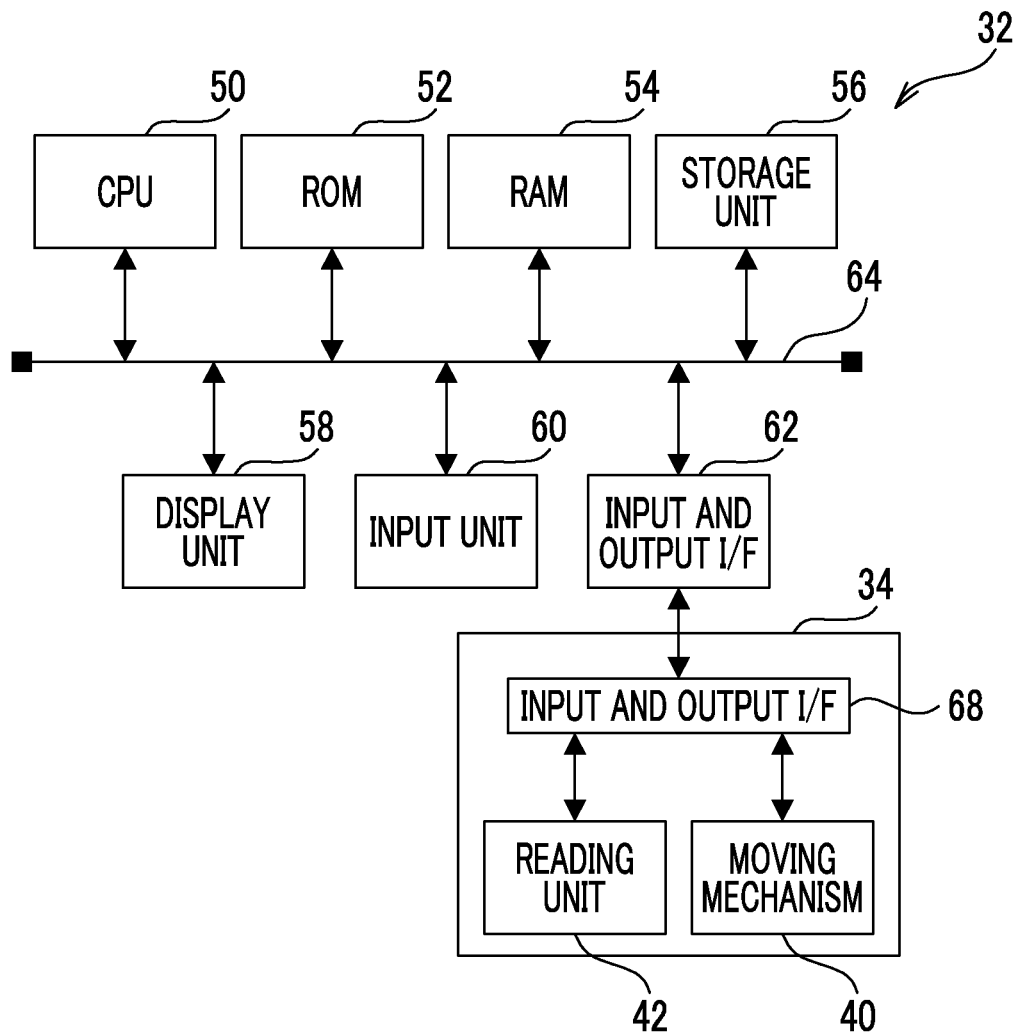
FIG. 4 is a block diagram illustrating an example of a main configuration of an electrical system of the recording control device according to the embodiment.
FIG. 5 is a diagram illustrating an example of drive quality information according to the embodiment.

Next, a main configuration of the electrical system of the recording control device 32 according to the embodiment will be described with reference to FIG. 4. As illustrated in FIG. 4, the recording control device 32 includes a central processing unit (CPU) 50, and a read only memory (ROM) 52 in which various programs and various parameters are stored in advance. Further, the recording control device 32 includes a random access memory (RAM) 54 that is used as a work area or the like at the time of executing various programs in the CPU 50, and a nonvolatile storage unit 56 such as a hard disk drive (HDD).

Further, the recording control device 32 includes a display unit 58 such as a liquid crystal display, an input unit 60 such as a keyboard and a mouse, and an input and output interface (I/F) 62. The CPU 50, ROM 52, the RAM 54, the storage unit 56, the display unit 58, the input unit 60, and the input and output I/F 62 are connected to each other via a bus 64.

The input and output I/F 62 of the recording control device 32 is connected to an input and output I/F 68 of the tape library 34. The moving mechanism 40 and the reading unit 42 are connected to the input and output I/F 68 of the tape library 34. With the above configuration, the CPU 50 can control the moving mechanism 40 and the reading unit 42 via the input and output I/F 62 and the input and output I/F 68.

Drive quality information indicating the quality of each of the tape drives 38 is stored in advance in the storage unit 56 of the recording control device 32 according to the embodiment. FIG. 5 illustrates an example of the drive quality information. As illustrated in FIG. 5, the drive quality information includes a value indicating the quality of the tape drive 38 for each tape drive 38 (hereinafter referred to as a "drive quality value"). The drive quality value according to the embodiment is a value of an integer of 1 to 10, and a smaller value indicates higher quality of the tape drive 38.

Note that in the embodiment, the case where the drive quality value included in the drive quality information is provided from a manufacturer of the tape drive 38 is described, but the present invention is not limited thereto. For example, the recording control device 32 may determine the drive quality value. In this case, for example, at the start of use of the tape drive 38, the recording control device 32 sets the drive quality value to a value corresponding to the highest quality. A form in which the recording control device 32 corrects the drive quality value into a greater value as a use period of the tape drive 38 increases is illustrated.

Further, for example, the recording control device 32 may correct the drive quality value to a greater value as the number of times of use of the tape drive 38 increases. Further, for example, the recording control device 32 may correct the drive quality value to a greater value as an error rate increases in a case where reading or writing from or to the recording tape T of the recording tape cartridge 10 is performed using the tape drive 38. Further, the recording control device 32 may correct the drive quality value using a combination of two or more of the use period, the number of times of use, and the error rate.

Figure 6:
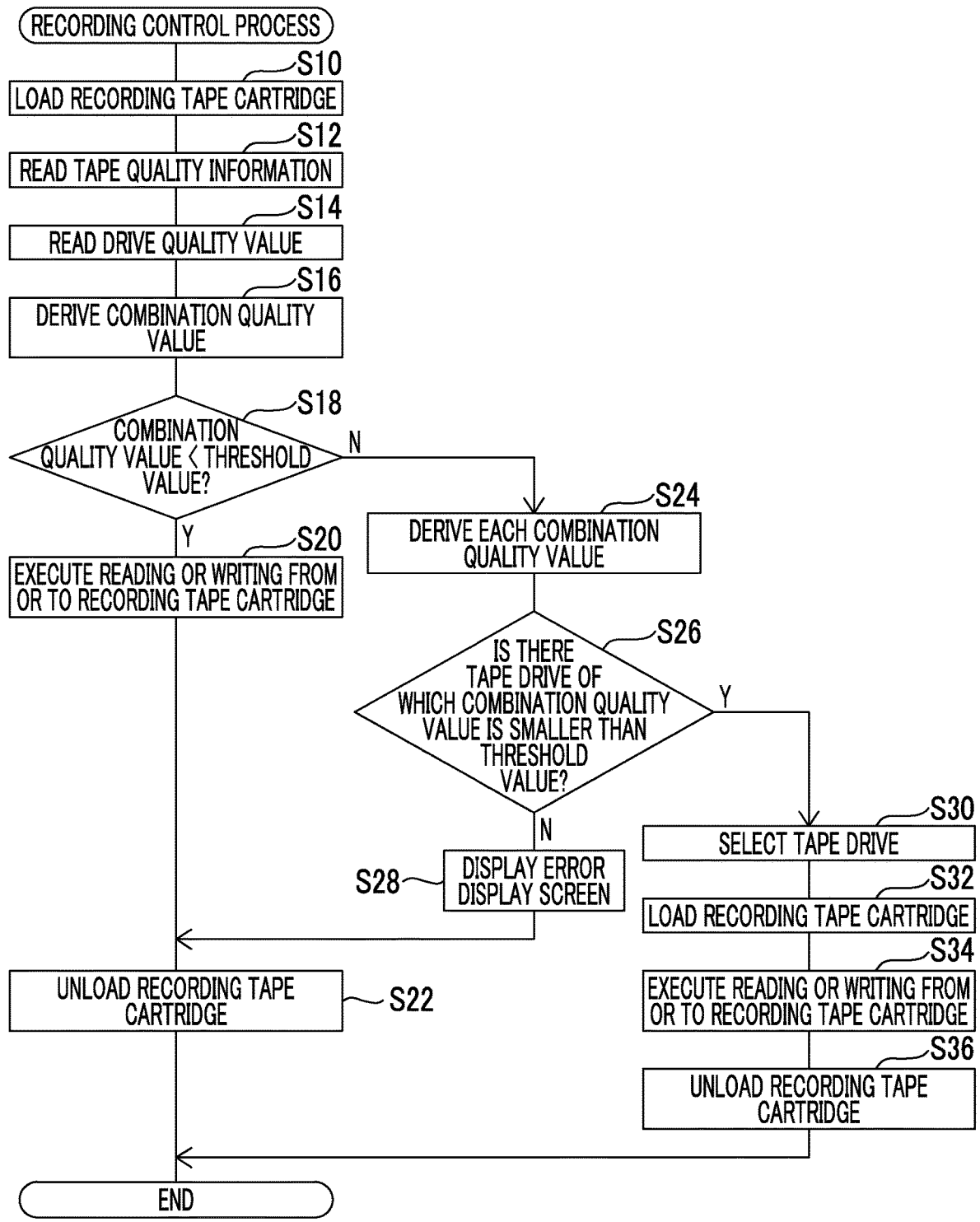
FIG. 6 is a flowchart illustrating an example of a flow of a recording control process according to the embodiment.

Next, an operation of the recording system 30 according to the embodiment will be described with reference to FIG. 6. The CPU 50 of the recording control device 32 executes a recording control program, such that a recording control process illustrated in FIG. 6 is executed. The recording control program is installed in advance in the ROM 52 of the recording control device 32. The recording control process illustrated in FIG. 6 is executed, for example, in a case where an execution instruction to read or write data to and from the recording tape T of the recording tape cartridge 10 is input by a user via the input unit 60. In the embodiment, the execution instruction includes information for identifying the recording tape cartridge 10 that is a reading or writing target (hereinafter referred to as "tape identification information"), and information for identifying the tape drive 38 that is used for reading or writing (hereinafter referred to as "drive identification information").

In step S10 of FIG. 6, the CPU 50 controls the moving mechanism 40 to take out the recording tape cartridge 10 indicated by the input tape identification information from the slot 36 and loads the recording tape cartridge 10 taken out into the tape drive 38 indicated by the drive identification information. In the next step S12, the CPU 50 performs control to cause the reading unit 42 built into the tape drive 38 into which the recording tape cartridge 10 has been loaded in step S10 to read the tape quality information recorded on the RFID tag 22 of the recording tape cartridge 10. The CPU 50 acquires the tape quality information read by the reading unit 42 via the input and output I/Fs 62 and 68.

In the next step S14, the CPU 50 reads the drive quality value corresponding to the tape drive 38 indicated by the input drive identification information from the drive quality information stored in the storage unit 56. In the next step S16, the CPU 50 multiplies the average value included in the tape quality information acquired in step S12 by the drive quality value read in step S14. Through this multiplication, the CPU 50 derives a value indicating quality of a combination of the quality of the recording tape cartridge 10 and the quality of the tape drive 38 (hereinafter referred to as "combination quality value").

In the next step S18, the CPU 50 determines whether or not the combination quality value derived in step S16 is smaller than a predetermined threshold value TH1 (for example, 14). In a case where the determination is negative, the process proceeds to step S24, and in a case where the determination is positive, the process proceeds to step S20. Note that as the threshold value TH1 in this case, for example, a predetermined value or the like can be applied as a smaller value as a required error rate is lower.

In step S20, according to the input execution instruction, the CPU 50 performs reading or writing of data from or to the recording tape cartridge 10 loaded in the tape drive 38 in step S10. In the next step S22, the CPU 50 unloads the recording tape cartridge 10 loaded into the tape drive 38 in step S10 from the tape drive 38. The CPU 50 controls the moving mechanism 40 to return the unloaded recording tape cartridge 10 to the slot 36. In a case where the process of step S22 is completed, this recording control process ends.

On the other hand, in step S24, the CPU 50 derives the combination quality value for the combination of the recording tape cartridge 10 indicated by the input tape identification information and each tape drive 38 other than the tape drive 38 indicated by the input drive identification information. In the next step S26, the CPU 50 determines whether or not there is a tape drive 38 of which the combination quality value derived in step S24 is smaller than the threshold value TH1. In a case where this determination is negative, the process proceeds to step S28.

Figure 7:
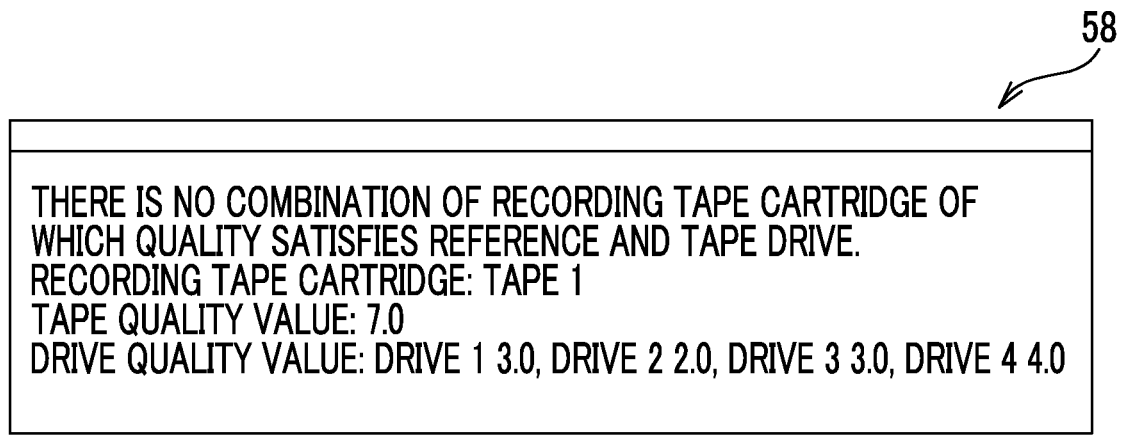
FIG. 7 is a diagram illustrating an example of an error display screen according to the embodiment.

In step S28, the CPU 50 displays on the display unit 58 an error display screen for displaying an error message indicating that there is no combination of the recording tape cartridge 10 and the tape drive 38 of which the quality satisfies a reference. FIG. 7 illustrates an example of the error display screen. As illustrated in FIG. 7, the tape identification information, the value indicating the quality of the recording tape cartridge 10 indicated by the tape identification information, the identification information of each tape drive 38, and the value indicating the quality thereof are displayed on the error display screen according to the embodiment, in addition to the above-described error message. An administrator of the recording system 30 performs a work for confirming content of the error display screen and exchanging at least one of the recording tape cartridge 10 and the tape drive 38. In a case where the process of step S28 ends, the process proceeds to step S22.

On the other hand, in a case where the determination in step S26 is positive, the process proceeds to step S30. In step S30, the CPU 50 selects the tape drive 38 of which the combination quality value derived in step S24 is smaller than the threshold value TH1. In the embodiment, in a case where there are a plurality of tape drives 38 of which the combination quality value is smaller than the threshold value TH1, the CPU 50 selects the tape drive 38 having the smallest combination quality value. That is, in this case, the CPU 50 selects the combination of the tape drives 38 having the highest quality.

In the next step S32, the CPU 50 unloads the recording tape cartridge 10 loaded into the tape drive 38 in step S10 from the tape drive 38. The CPU 50 controls the moving mechanism 40 to load the unloaded recording tape cartridge 10 into the tape drive 38 selected in step S30.

In the next step S34, the CPU 50 performs reading or writing of data from or to the recording tape cartridge 10 loaded into the tape drive 38 in step S32 according to the input execution instruction. In the next step S36, the CPU 50 unloads the recording tape cartridge 10 loaded into the tape drive 38 in step S32 from the tape drive 38. The CPU 50 controls the moving mechanism 40 to return the unloaded recording tape cartridge 10 to the slot 36. In a case where the process of step S36 ends, this recording control process ends.

Next, an operation of the recording system 30 according to the embodiment will be described as a specific example with reference to FIG. 8. Note that FIG. 8 illustrates all combinations quality values in a case where the tape library 34 has four tape drives 38 and ten slots 36, and the recording tape cartridge 10 is stored in each slot 36.

For example, in a case where "Tape 2" and "Drive 2" are designated from the user via the input unit 60 and an execution instruction is input, a combination quality value (14.6) of "Tape 2" and "Drive 2" is equal to or greater than the threshold value TH1. Therefore, a determination in step S18 of the recording control process becomes a negative determination. Further, the combination quality value of each of a combination of "Tape 2" and "Drive 1", a combination of "Tape 2" and "Drive 3", and a combination of "Tape 2" and "Drive 4" is also equal to or greater than the threshold value TH1. Therefore, the determination in step S26 of the recording control process also becomes a negative determination. Therefore, in this case, reading or writing of data from or to "Tape 2" is not performed, and an error display screen is displayed on the display unit 58 through the process of step S28 of the recording control process.

Further, for example, in a case where "Tape 8" and "Drive 3" are designated from the user via the input unit 60 and the execution instruction is input, the combination quality value (16.5) of "Tape 8" and "Drive 3" is equal to or greater than the threshold value TH1. Therefore, a determination in step S18 of the recording control process becomes a negative determination. Further, the combination quality values of the combination of "Tape 8" and "Drive 1", the combination of "Tape 8" and "Drive 2", and the combination of "Tape 8" and "Drive 4" are all smaller than the threshold value TH1. Therefore, a determination in step S26 of the recording control process becomes a positive determination, and "Drive 2" having a minimum combination quality value (6.6) is selected through the process in step S30. Accordingly, in this case, "Tape 8" is loaded into "Drive 2", and reading or writing of data from or to "Tape 2" is performed through the processes of steps S32 and S34 of the recording control process.

Further, for example, in a case where "Tape 4" and "Drive 1" are designated from the user via the input unit 60 and the execution instruction is input, the combination quality value (5.4) of "Tape 4" and "Drive 1" is smaller than the threshold value TH1. Therefore, the determination in step S18 of the recording control process becomes a positive determination. Therefore, in this case, reading or writing of data from or to "Tape 4" loaded into "Drive 1" is performed through the process of step S20 of the recording control process.

As described above, according to the embodiment, the following process is performed in a case where reading or writing of data from or to the recording tape included in the recording tape cartridge is performed. That is, in this case, reading or writing of the data from or to the recording tape using the tape drive in the combination of which the quality is lower than predetermined quality among the combinations of the quality of the recording tape cartridge indicated by the tape quality information and the quality of each of the plurality of tape drives indicated by the drive quality information is prohibited. Therefore, it is possible to reduce the error rate of reading or writing of data from or to the recording tape included in the recording tape cartridge.

Further, according to the embodiment, in a case where reading or writing of data from or to the recording tape is performed, the tape drive in the combination of which the quality is equal to or higher than predetermined quality among combinations of the quality of the recording tape cartridge and the quality of each of the plurality of tape drives is selected. Reading or writing of data from or to the recording tape is performed using the selected tape drive. Therefore, it is possible to perform reading or writing of data from or to the recording tape after reducing the error rate of reading or writing of data from or to the recording tape included in the recording tape cartridge.

Note that in the above embodiment, the case where the tape quality information is recorded on the RFID tag 22 has been described, but the invention is not limited thereto. For example, the tape quality information may be recorded at head of the recording tape T, or may be recorded on a bar code label affixed at a predetermined position on an outer circumferential surface of the case 12.

Further, in the above embodiment, the case where a value indicating higher quality as the value is smaller is applied as the tape quality value and the drive quality value has been described, but the present invention is not limited thereto. For example, a form in which a value indicating higher quality as the value is greater is applied as the tape quality value and the drive quality value may be adopted. In this case, a form in which reading or writing of data from or to the recording tape cartridge 10 is performed using the recording tape cartridge 10 and the tape drive 38 in the combination of which the combination quality value exceeds a predetermined threshold value is illustrated.

Further, in the above-described embodiment, the case in which the tape quality information recorded on the RFID tag 22 is read in a case where reading or writing of data from or to the recording tape T is performed has been described, but the present invention is not limited thereto. For example, a form in which the following process is performed before an instruction to execute reading or writing of data from or to the recording tape T is input, such as a time when the recording tape cartridge 10 is stored in the slot 36, may be adopted. That is, in this case, a form in which the tape quality information recorded on the RFID tag 22 of each recording tape cartridge 10 is read in advance and the read tape quality information is stored in the storage unit 56 of the recording control device 32 may be adopted. In this case, a form in which the tape quality information stored in the storage unit 56 is read in a case where reading or writing of data from or to the recording tape T is performed is illustrated. Specifically, a form in which the tape quality information stored in the storage unit 56 is read in step S12 of the recording control process is illustrated.

Further, in this case, the combination quality values may be derived in advance for all combinations of the recording tape cartridge 10 and the tape drive 38 and, for example, a table of combination quality values as illustrated in FIG. 8 may be stored in storage unit 56. In this case, a form in which the determination in step S18 and step S26 of the recording control process is performed with reference to the table of combination quality values stored in the storage unit 56 is illustrated.

Further, in the above embodiment, the case where the reading unit 42 is built into the tape drive 38 has been described, but the present invention is not limited thereto. For example, a form in which the reading unit 42 is provided in the moving mechanism 40 may be adopted. In this case, the reading unit 42 can read the tape quality information recorded on the RFID tag 22 before the recording tape cartridge 10 is taken out from the slot 36 without loading the recording tape cartridge 10 into the tape drive 38.

Further, in the above embodiment, the case in which the tape drive 38 of which the combination quality value is smaller than the threshold value TH1 is selected has been described, but the present invention is not limited thereto. For example, the recording tape cartridge 10 of which the combination quality value is smaller than the threshold value TH1 may be selected. In this case, in a case where the reading unit 42 is provided in the moving mechanism 40, the moving mechanism 40 is controlled and the tape quality information recorded on the RFID tag 22 is read before the recording tape cartridge 10 is taken out from the slot 36. The recording tape cartridge 10 of which the combination quality value derived from the tape quality value and the drive quality value included in the read tape quality information is smaller than the threshold value TH1 is selected. In this case, a form in which the selected recording tape cartridge 10 is taken out from the slot 36 and loaded into the tape drive 38 is illustrated.

Further, in the above embodiment, a forced execution mode in which reading or writing of data from or to the recording tape cartridge 10 is performed even in a case where all the combination quality values are equal to or greater than the threshold value TH1 may be prepared. A form in which the following process is performed in a case where the forced execution mode is designated by the user and a case where there is no combination in which the combination quality value is smaller than the threshold value TH1 is illustrated. That is, in this case, a form in which the error display screen is not displayed on the display unit 58, and reading or writing of data from or to the recording tape cartridge 10 using the tape drives 38 in the combination of which the combination quality value is smallest is illustrated.

Further, in the above embodiment, the case where the value obtained by multiplying the average value of the PES levels included in the tape quality information by the drive quality value is applied as the combination quality value has been described, but the present invention is not limited thereto. A form in which a value obtained by adding the average value of the PES levels included in the tape quality information to the drive quality value is applied as the combination quality value may be adopted.

Further, in the above embodiment, the case where the average value of the PES levels of the entire recording tape T is applied as the value indicating the quality of the recording tape cartridge 10 has been described, but the present invention is not limited thereto. A representative value other than the average value such as a maximum value (that is, the lowest quality value) and a median value among the PES levels of each block of the recording tape T may be applied as the value indicating the quality of the recording tape cartridge 10. Further, for example, in a case where a portion that is a target of reading or writing of data is limited to a portion of the recording tape T (for example, 50 m or the like from a beginning), an average value of the PES levels of the portion that is the target of reading or writing of data may be applied as the value indicating the quality of the recording tape cartridge 10.

Further, in the above embodiment, the case where the RFID tag 22 is applied as the recording medium capable of reading recorded information without contact has been described, but the present invention is not limited thereto. For example, a memory card having a wireless communication function may be applied as the recording medium capable of reading recorded information without contact.

Further, in the above embodiment, the case where the RFID tag using a passive method is applied as the RFID tag 22 has been described, but the present invention is not limited thereto. For example, an RFID tag using a method of transmitting radio waves (a so-called active method) may be applied as the RFID tag 22.

Further, in the above embodiment, various types of processors other than the CPU may execute the recording control process executed by the CPU executing the software (program). As the processor in this case, a programmable logic device (PLD) of which a circuit configuration can be changed after manufacture such as a field-programmable gate array (FPGA), a dedicated electrical circuit which is a processor having a circuit configuration designed to be dedicated for execution of a specific process such as an application specific integrated circuit (ASIC), or the like is illustrated. Further, the recording control process may be executed by one of the various processors, or may be executed by a combination of two or more of the same or different types of processors (for example, a combination of a plurality of FPGAs or a CPU and an FPGA). A hardware structure of the various processors is, more specifically, an electrical circuit in which circuit elements such as semiconductor elements are combined.

Further, in the above embodiment, the form in which the recording control program is stored (installed) in the ROM 52 in advance has been described, but the present invention is not limited thereto. The recording control program may be provided as a form recorded on a recording medium such as a compact disk read only memory (CD-ROM), a digital versatile disk read only memory (DVD-ROM), and a universal serial bus (USB) memory. Further, the recording control program may be a form downloaded from an external device over a network.

EXPLANATION OF REFERENCES

10: recording tape cartridge
12: case
13: pin holding portion
14: opening
15: groove
16: leader pin
16A: annular groove
16B: both end portions
18: door
18A: convex portion
20: reel
22: RFID tag
30: recording system
32: recording control device
34: tape library
36: slot
38: tape drive
40: moving mechanism
42: reading unit
50: CPU
52: ROM
54: RAM
56: storage unit
58: display unit
60: input unit
62, 68: input and output I/F
64: bus
FR, RH, UP: arrow
T: recording tape

What is claimed is:

1. A recording control device comprising:
a reading unit that reads tape quality information indicating quality of a recording tape cartridge recorded on a recording medium included in the recording tape cartridge;
an acquisition unit that acquires drive quality information indicating quality of each of a plurality of tape drives that are loading targets of the recording tape cartridge; and
a prohibition unit that prohibits reading or writing of data from or to the recording tape using the tape drive, in a case in which a combination of a recording tape cartridge quality value, indicated by the tape quality information and including a position error signal level, and a tape drive quality value, indicated by the drive quality information, is lower than a predetermined value.

2. The recording control device according to claim 1, further comprising:
a control unit that selects a combination of the tape drive and the recording tape cartridge for reading or writing of data from or to the recording tape, in a case in which a combination of the recording tape cartridge quality value and the tape drive quality value is equal to or higher than a predetermined value.

3. The recording control device according to claim 2, wherein the tape quality information indicates the recording tape cartridge quality value at predetermined intervals in a pullout direction of the recording tape.

4. The recording control device according to claim 1, wherein the recording medium is built into the recording tape cartridge and is configured to be accessible without contact.

5. A recording control method comprising:
reading tape quality information indicating quality of a recording tape cartridge recorded on a recording medium included in the recording tape cartridge;
acquiring drive quality information indicating quality of each of a plurality of tape drives that are loading targets of the recording tape cartridge; and
prohibiting reading or writing of data from or to the recording tape using the tape drive, in a case in which a combination of a recording tape cartridge quality value, indicated by the tape quality information and including a position error signal level, and a tape drive quality value, indicated by the drive quality information, is lower than a predetermined value.

* * * * *